United States Patent
Chen et al.

(10) Patent No.: US 10,884,651 B2
(45) Date of Patent: Jan. 5, 2021

(54) STORAGE SYSTEM WITH MULTI-PHASE VERIFICATION OF SYNCHRONOUSLY REPLICATED DATA

(71) Applicant: EMC IP Holding Company LLC, Hopkinton, MA (US)

(72) Inventors: Xiangping Chen, Sherborn, MA (US); Svetlana Kronrod, Concord, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 198 days.

(21) Appl. No.: 16/042,503

(22) Filed: Jul. 23, 2018

(65) Prior Publication Data

US 2020/0026429 A1 Jan. 23, 2020

(51) Int. Cl.
*G06F 3/06* (2006.01)
*G06F 12/00* (2006.01)
*G06F 13/00* (2006.01)

(52) U.S. Cl.
CPC ............ *G06F 3/065* (2013.01); *G06F 3/067* (2013.01); *G06F 3/0619* (2013.01)

(58) Field of Classification Search
CPC ......... G06F 3/065; G06F 3/0619; G06F 3/067
USPC ..................................................... 711/162
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 8,402,250 B1 * | 3/2013 | Juillard ............... G06F 16/137 711/216 |
| 9,104,326 B2 | 8/2015 | Frank et al. |
| 9,208,162 B1 | 12/2015 | Hallak et al. |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Mohamed M Gebril
(74) *Attorney, Agent, or Firm* — Ryan, Mason & Lewis, LLP

(57) ABSTRACT

A storage system in one embodiment is configured to participate as a source storage system in a synchronous replication process with a target storage system. In verifying synchronously replicated data, the source storage system generates a current snapshot for one or more storage volumes subject to synchronous replication to the target storage system, identifies a plurality of pages of the current snapshot that have changed since generation of a previous snapshot for the one or more storage volumes, obtains content-based signatures for respective ones of the changed pages, assigns the changed pages to a page group, generates a group signature for the page group based at least in part on the content-based signatures of the pages of the page group, and sends the group signature to the target storage system. The group signature is configured to allow the target storage system to determine if the page group contains at least one page that is inconsistent between the source and target storage systems.

20 Claims, 5 Drawing Sheets

(56) References Cited

U.S. PATENT DOCUMENTS

| | | | |
|---|---|---|---|
| 9,239,687 B2* | 1/2016 | Vijayan | G06F 3/061 |
| 9,286,003 B1 | 3/2016 | Hallak et al. | |
| 9,304,889 B1* | 4/2016 | Chen | G06F 11/3433 |
| 9,497,028 B1* | 11/2016 | Yu | H04L 9/14 |
| 9,606,870 B1 | 3/2017 | Meiri et al. | |
| 9,614,909 B2* | 4/2017 | Yochai | H04L 67/1095 |
| 9,716,754 B2 | 7/2017 | Swift | |
| 9,959,073 B1* | 5/2018 | Meiri | G06F 11/1466 |
| 10,013,200 B1* | 7/2018 | Shveidel | G06F 3/0613 |
| 10,261,718 B1* | 4/2019 | Tummala | G06F 3/065 |
| 2007/0180309 A1* | 8/2007 | Zohar | G06F 11/2058 714/6.12 |
| 2007/0233989 A1* | 10/2007 | Garcia-Arellano | G06F 12/0646 711/170 |
| 2008/0279462 A1 | 11/2008 | Celi, Jr. | |
| 2009/0037688 A1* | 2/2009 | Kalyanasundharam | G06F 15/17 711/202 |
| 2009/0132955 A1 | 5/2009 | Garg et al. | |
| 2009/0265518 A1* | 10/2009 | McClure | G06F 16/273 711/162 |
| 2010/0179941 A1 | 7/2010 | Agrawal et al. | |
| 2012/0017060 A1* | 1/2012 | Kapanipathi | G06F 3/065 711/162 |
| 2012/0320679 A1* | 12/2012 | Sprouse | G11C 7/1015 365/185.12 |
| 2013/0325824 A1 | 12/2013 | Shoens | |
| 2014/0089564 A1* | 3/2014 | Liu | G06F 12/0246 711/103 |
| 2014/0181016 A1 | 6/2014 | Whitehead et al. | |
| 2014/0344222 A1* | 11/2014 | Morris | G06F 16/1844 707/634 |
| 2015/0067340 A1* | 3/2015 | Joye | H04L 9/0869 713/175 |
| 2016/0150012 A1 | 5/2016 | Barszczak et al. | |
| 2016/0170987 A1 | 6/2016 | Kesselman | |
| 2016/0202927 A1* | 7/2016 | Klarakis | G06F 3/0665 709/217 |
| 2016/0210064 A1* | 7/2016 | Dornemann | G06F 3/064 |
| 2016/0224259 A1 | 8/2016 | Ahrens et al. | |
| 2017/0091045 A1* | 3/2017 | Bangalore | G06F 11/1461 |
| 2017/0168903 A1* | 6/2017 | Dornemann | G06F 9/45558 |
| 2017/0192857 A1 | 7/2017 | Meiri et al. | |
| 2018/0150335 A1* | 5/2018 | Doi | G06F 11/3089 |
| 2019/0325055 A1* | 10/2019 | Lee | G06F 3/067 |
| 2020/0026429 A1* | 1/2020 | Chen | G06F 11/1451 |
| 2020/0034277 A1* | 1/2020 | Shveidel | G06F 11/3644 |
| 2020/0042183 A1* | 2/2020 | Meiri | G06F 3/0619 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

DELL EMC, "XtremIO v6.0 Specifications," Specification Sheet, 2017, 4 pages.

DELL EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

DELL EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

DELL EMC, "Introduction to Dell EMC XtremIO X2 Storage Array—A Detailed Review," Dell EMC White Paper, Apr. 2018, 52 pages.

DELL EMC, "Introduction to XtremIO Metadata-Aware Replication," Dell EMC White Paper, Apr. 2018, 18 pages.

U.S. Appl. No. 15/662,809 filed in the name of William Stronge et al. filed Jul. 28, 2017 and entitled "Automatic Verification of Asynchronously Replicated Data.".

* cited by examiner

STORAGE SYSTEM WITH MULTI-PHASE VERIFICATION OF SYNCHRONOUSLY REPLICATED DATA

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Source site and target site storage systems can therefore each be configured to support both asynchronous and synchronous replication modes.

Conventional approaches to data replication can be problematic under certain conditions. For example, communication link failures or other types of failures occurring during synchronous replication can make it difficult to preserve target replica consistency without undermining system performance. It is therefore particularly important to perform data verification as part of the synchronous replication process.

Unfortunately, conventional approaches fail to provide sufficiently high levels of accuracy and efficiency in the performance of such data verification. For example, some of these approaches consume excessive amounts of network bandwidth resources between source and target storage systems. Additionally or alternatively, some conventional approaches have difficulty dealing with write requests that are already being processed or "in flight" during data verification.

SUMMARY

Illustrative embodiments provide techniques for multi-phase verification of data synchronously replicated from a source storage system to a target storage system in an information processing system. A given such embodiment utilizes at least a first phase and possibly a second phase in each of a plurality of iterations of data verification operations, with the first phase of a given iteration verifying replicated data of a group of pages utilizing a group signature and the second phase of the given iteration identifying one or more individual problematic pages in the given group of pages only if that particular group of pages was collectively identified as problematic in the first phase. Different pages are included in the page group in different iterations of the data verification operations, until all replicated data has been subject to data verification. Such arrangements advantageously provide highly efficient data verification that can substantially reduce network bandwidth consumption between the source and target storage systems while also avoiding any data integrity issues that may arise from write requests that are "in flight" during data verification.

These embodiments illustratively include a clustered implementation of a content addressable storage system having a distributed storage controller. Similar advantages can be provided in other types of storage systems.

In one embodiment, an apparatus comprises a storage system configured to participate as a source storage system in a synchronous replication process with a target storage system. In conjunction with the synchronous replication process, the source storage system in performing data verification operations is further configured to generate a current snapshot for one or more storage volumes subject to synchronous replication to the target storage system, to identify a plurality of pages of the current snapshot that have changed since generation of a previous snapshot for the one or more storage volumes, to obtain content-based signatures for respective ones of the changed pages, to assign the changed pages to a page group, to generate a group signature for the page group based at least in part on the content-based signatures of the pages of the page group, and to send the group signature to the target storage system. The group signature is configured to allow the target storage system to determine if the page group contains at least one page that is inconsistent between the source and target storage systems.

The source storage system illustratively repeats at least a portion of its data verification operations utilizing a different pair of snapshots in each of a plurality of iterations with the current snapshot for one of the iterations becoming the previous snapshot for a subsequent one of the iterations. The iterations continue until all replicated data of the one or more storage volumes has been subject to data verification.

A given iteration of the data verification operations can include just a first phase, if no inconsistency is found for the page group, or both a first phase and a second phase, where the second phase attempts to identify one or more inconsistent pages in a page group that has been identified as inconsistent in the first phase.

Different iterations can therefore perform different sets of data verification operations, depending upon whether or not those iterations include just the first phase or both first and second phases. Other types and arrangements of phases, iterations and data verification operations can be used in other embodiments.

In some embodiments, identifying a plurality of pages of the current snapshot that have changed since generation of a previous snapshot for the one or more storage volumes comprises excluding any pages that are in the process of being changed at the time of performance of the data verification operations. One or more of the excluded pages in a current iteration of the data verification operations are illustratively assigned to a different page group in a subsequent iteration of the data verification operations.

The source storage system is illustratively configured to initiate a subsequent iteration of the data verification operations responsive to receipt of an indication from the target storage system that there is no inconsistency between the group signature received from the source storage system and a corresponding group signature generated in the target storage system. This is an example of an arrangement in which the current iteration includes only the first phase of the data verification operations.

The source storage system is illustratively configured to initiate a further phase of the data verification operations to identify one or more particular inconsistent pages of the page group in a current iteration of the data verification operations, responsive to receipt of an indication from the target storage system that there is an inconsistency between the group signature received from the source storage system and a corresponding group signature generated in the target storage system. This is an example of an arrangement in which the current iteration includes both the first phase and the second phase of the data verification operations, with the "further phase" in this example referring to the second phase.

In some embodiments, the source storage system comprises a plurality of storage nodes each comprising one or more of the storage devices, with each of the storage nodes of the target storage system further comprises a set of processing modules configured to communicate over one or more networks with corresponding sets of processing modules on other ones of the storage nodes. The sets of processing modules of the storage nodes of the source storage system collectively comprise at least a portion of the storage controller of the source storage system. Each of the sets of processing modules illustratively comprises one or more control modules, one or more routing modules and one or more data modules, and at least one of the sets of processing modules comprises a management module.

The source and target storage systems illustratively comprise respective content addressable storage systems having respective sets of non-volatile memory storage devices. For example, the storage devices of the source and target storage systems in such embodiments can be configured to collectively provide respective all-flash storage arrays. The source and target storage systems may be associated with respective source and target sites of the replication process. For example, the source site may comprise a production site data center and the target site may comprise a disaster recovery site data center. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
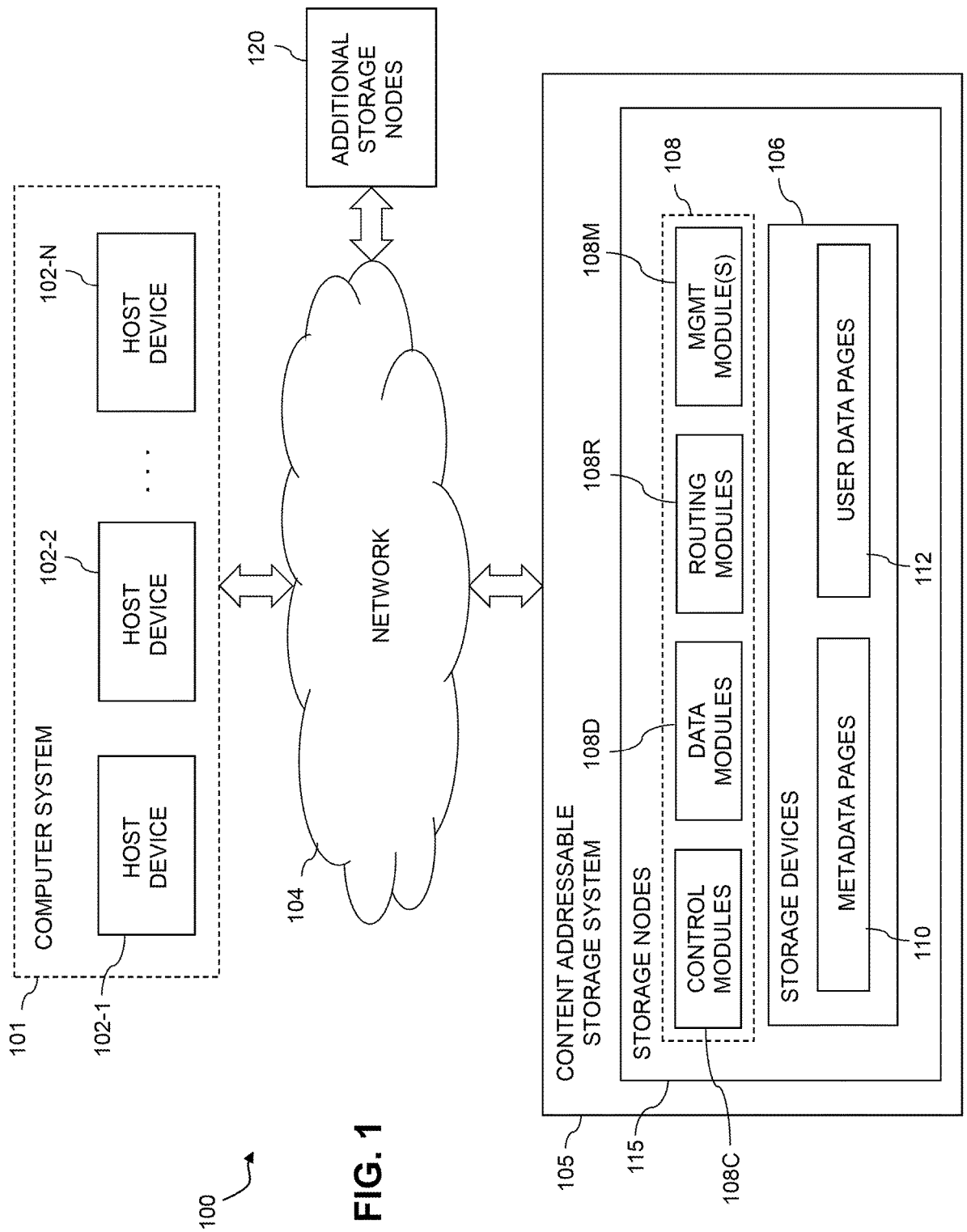
FIG. 1 is a block diagram of an information processing system comprising a content addressable storage system configured with functionality for multi-phase verification of synchronously replicated data in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments. The content addressable storage system 105 will be referred to in subsequent description herein as simply storage system 105.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and storage system 105 may be part of an enterprise computing and storage system, a cloud-based system or another type of system. For example, the host devices 102 and the storage system 105 can be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 are configured to write data to and read data from the storage system 105. The host devices 102 and the storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102. In some embodiments, one or more of the host devices 102 illustratively comprise respective compute nodes of an enterprise computer system, cloud-based computer system or other arrangement of multiple compute nodes associated with respective users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the storage system 105.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. For example, the storage system 105 can comprise an otherwise conventional XtremIO™ storage array or other type of content addressable storage system that is suitably modified to incorporate functionality for multi-phase verification of synchronously replicated data as disclosed herein. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, such additional storage nodes 120 may be part of another clustered storage system of the system 100. Each of the storage nodes 115 of the storage system 105 is assumed to be implemented using at least one processing device comprising a processor coupled to a memory. Other types and arrangements of nodes can be used to implement a clustered storage system in other embodiments.

The storage controller 108 of the storage system 105 in the present embodiment is configured to control the implementation of functionality for multi-phase verification of synchronously replicated data as disclosed herein. The storage controller 108 is assumed to comprise a type of "processing device" as that term is broadly used herein, and more particularly comprises at least one processor coupled to a memory. The storage system 105 under the control of the storage controller 108 is operative to participate as a source storage system in a replication process with a target storage system, as will be described in more detail below.

Although illustratively shown as being implemented within the storage system 105, the storage controller 108 in other embodiments can be implemented at least in part within the computer system 101, in another system component, or as a stand-alone component coupled to the network 104.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Each of the storage nodes 115 of the storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the storage system 105 is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the storage system 105 is illustratively distributed among the control modules 108C.

The functionality for multi-phase verification of synchronously replicated data in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include replication control logic that engages or otherwise interacts with corresponding control logic instances in all of the control modules 108C and routing modules 108R in order to implement a synchronous replication process.

In some embodiments, the storage system 105 comprises an XtremIO™ storage array suitably modified to incorporate techniques for multi-phase verification of synchronously replicated data as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, multi-phase verification of synchronously replicated data in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation. The C-modules, D-modules and R-modules communicate with one another and the SYM module over a high-speed internal network such as an InfiniBand (IB) network.

In some embodiments, the network interconnecting these modules comprises a full mesh network, such that a given one of the modules can communicate with all of the other modules. The C-modules, D-modules and R-modules coordinate with one another under the system-wide control of the SYM module to accomplish various input-output (IO) processing tasks, such as writing to logical storage volumes and reading from logical storage volumes.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the storage system 105 each illustratively comprise one or more IO operations directing that at least one data item of the storage system 105 be written to in a particular manner. A given write request is illustratively received in the storage system 105 from a host device, illustratively one of the host devices 102. In some embodiments, a write request is received in the distributed storage controller 108 of the storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The write requests from the host devices 102 identify particular data pages to be written in the storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 105.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 105 correspond to respective physical blocks of a physical layer of the storage system 105. The user data pages of the logical layer are organized by LBA and have reference via respective content-based signatures to particular physical blocks of the physical layer.

Each of the physical blocks has an associated reference count that is maintained within the storage system 105. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement multi-phase verification of synchronously replicated data in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

The storage controller 108 of storage system 105 in the FIG. 1 embodiment includes replication control logic that is illustratively implemented in a distributed manner utilizing at least a subset of the control modules 108C, data modules 108D, routing modules 108R and management module(s) 108M. Other types of replication control logic can be implemented in the storage controller 108 in other embodiments. For example, the replication control logic in some embodiments comprises a replication engine that in some implementations is in the form of a separate module.

The storage controller 108 and storage system 105 should also be understood to include additional modules and other components typically found in conventional implementations of storage controllers and storage systems, although such additional modules and other components are omitted from the figure for clarity and simplicity of illustration.

The storage controller 108 via its replication control logic is configured to operate as a source storage system in a replication process carried out with a target storage system that is not explicitly shown in the figure but may be coupled to network 104 and may comprise at least a subset of the additional storage nodes 120. The replication process illustratively comprises a synchronous replication process that is initiated in the source storage system to replicate one or more logical storage volumes from the source storage system to the target storage system. The synchronous replication process initiated in the storage system 105 is illustratively configured to replicate one or more production storage volumes to corresponding recovery storage volumes of the target storage system. The target storage system in some embodiments is assumed to comprise a clustered storage system having a plurality of storage nodes implementing a distributed storage controller substantially the same as distributed storage controller 108 of storage system 105.

The synchronous replication in some embodiments is configured such that host write operations directed to the production storage volumes of the source storage system by one or more of the host devices 102 are mirrored to the corresponding recovery storage volumes of the target storage system.

More particularly, in this embodiment, the storage controller 108 of the source storage system comprises replication control logic configured to cooperatively interact with corresponding replication control logic in a storage controller of the target storage system in order to execute at least a synchronous replication process carried out between the source and target storage systems. The target storage system can be implemented on the same processing platform as the source storage system or on a different processing platform. The replication control logic of a given one of the source and target storage systems may comprise software, hardware or firmware, or combinations thereof, implemented in one or more storage node processing modules, such as control modules, data modules, routing modules and management modules of a distributed storage controller of the corresponding storage system.

The synchronous replication process can more particularly comprise a synchronous replication mode of a multiple-mode replication process that includes both asynchronous and synchronous replication modes. For example, a given such multiple-mode replication process can comprise a cycle-based asynchronous replication mode in which differential data derived from snapshots of the production storage volumes of the source storage system is utilized to update the corresponding recovery storage volumes of the target storage system in each of a plurality of replication cycles.

A given "replication process" as that term is broadly used herein may therefore include both asynchronous and synchronous replication modes of a multiple-mode replication process as well as support for concurrent operation of such modes and separate operation of the individual modes. The term "mode" as used herein in conjunction with asynchronous or synchronous replication may therefore itself comprise a corresponding asynchronous or synchronous replication process.

The replication process is illustratively configured to replicate particular designated production storage volumes or other logical storage volumes of the storage system 105 to the target storage system. A given such production storage volume designated for replication by the storage system 105 illustratively comprises a set of one or more LUNs or other logical storage volumes of the storage system 105. Each such logical storage volume comprises at least a portion of a physical storage space of one or more of the storage devices 106. Other arrangements of one or more storage volumes may be designated for replication as part of a given replication process in other embodiments.

In conjunction with the replication process, the storage system 105 participating as a source storage system relative to a target storage system in performance of data verification operations is configured to generate a current snapshot for one or more storage volumes subject to synchronous replication to the target storage system, to identify a plurality of pages of the current snapshot that have changed since generation of a previous snapshot for the one or more storage volumes, to obtain content-based signatures for respective ones of the changed pages, to assign the changed pages to a page group, to generate a group signature for the page group based at least in part on the content-based signatures of the pages of the page group, and to send the group signature to the target storage system. The group signature is configured to allow the target storage system to determine if the page group contains at least one page that is inconsistent between the source and target storage systems.

The page group in some embodiments has a size that is determined based at least in part on a message buffer size of the source storage system, although other techniques can be used to establish the page size in other embodiments.

Figure 2:
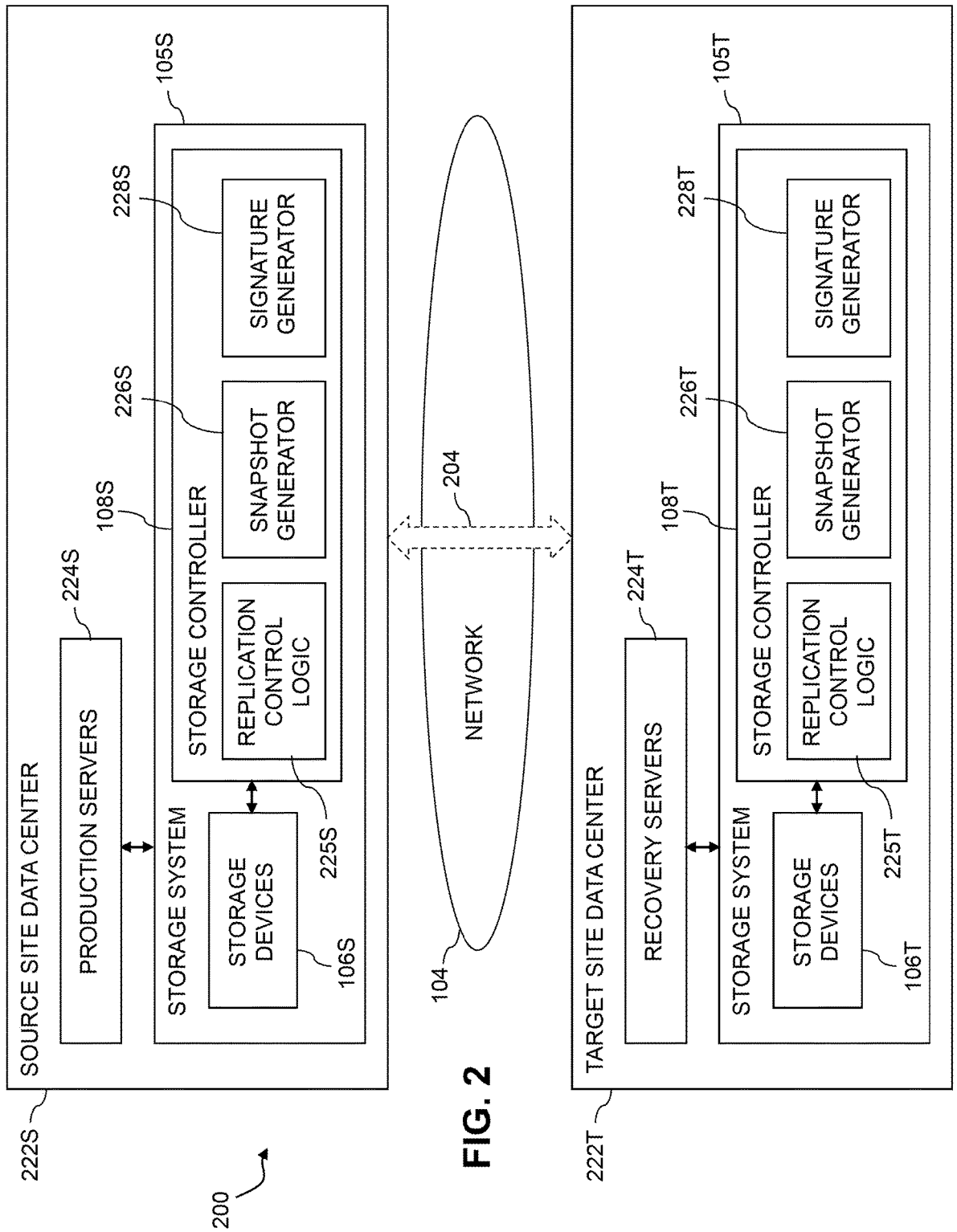
FIG. 2 is a block diagram of an information processing system comprising source site and target site storage systems configured for multi-phase verification of synchronously replicated data in an illustrative embodiment.

The storage system 105 in the following description is referred to as the "source storage system." Another instance of storage system 105 illustratively serves as the "target storage system," as shown in the embodiment of FIG. 2.

The source storage system is configured to repeat at least a portion of its data verification operations utilizing a different pair of snapshots in each of a plurality of iterations, with the current snapshot for one of the iterations becoming the previous snapshot for a subsequent one of the iterations. The iterations continue until all replicated data of the one or more storage volumes has been subject to data verification.

In some embodiments, identifying a plurality of pages of the current snapshot that have changed since generation of a previous snapshot for the one or more storage volumes comprises excluding any pages that are in the process of being changed at the time of performance of the data verification operations. One or more of the excluded pages in a current iteration of the data verification operations are assigned to a different page group in a subsequent iteration of the data verification operations.

As a more particular example, identifying a plurality of pages of the current snapshot that have changed since generation of a previous snapshot for the one or more storage volumes illustratively comprises aggregating "dirty" page data structures of the current and previous snapshots to identify a first set of one or more pages that have changed since a previous iteration of the data verification operations, excluding from the first set of pages one or more pages identified in one or more dirty page data structures of the one or more storage volumes subject to synchronous replication to obtain a second set of pages, and identifying the second set of pages as the changed pages. The dirty page data structures illustratively comprise respective dirty trees that indicate changed portions of the respective snapshots. The term "dirty" in this context and other similar contexts herein is intended to encompass, for example, an indication that a particular portion of one or more storage volumes has been subject to one or more write requests since generation of the snapshot.

The source storage system is illustratively configured to wait for a designated waiting period after generation of the current snapshot in order to ensure that all data of the one or more storage volumes captured by current snapshot has been replicated to the target storage system.

As noted above, the group signature for the page group is based at least in part on the content-based signatures of the pages of the page group. For example, the group signature may be generated as a function of at least one volume pairing label, at least one page offset and the content-based signatures.

In some embodiments, sending the group signature to the target storage system comprises generating a volume offset extent list for contiguous page offsets, with the volume offset extent list comprising one or more volume offset extents each comprising a volume pairing label, a volume start offset and a length, and sending the group signature and the volume offset extent list to the target storage system. The group signature and volume offset extent list are utilized by the target storage system to reconstruct the page group, to generate a group signature for the reconstructed page group, and to determine if there is any inconsistency between the group signature received from the source storage system and the group signature generated in the target storage system for the reconstructed page group.

The source storage system initiates a subsequent iteration of the data verification operations responsive to receipt of an indication from the target storage system that there is no inconsistency between the group signature received from the source storage system and a corresponding group signature generated in the target storage system.

The source storage system initiates a further phase of the data verification operations to identify one or more particular inconsistent pages of the page group in a current iteration of the data verification operations, responsive to receipt of an indication from the target storage system that there is an inconsistency between the group signature received from the source storage system and a corresponding group signature generated in the target storage system.

The source storage system in the further phase of the data verification operations is configured to send to the target storage system, for each of the pages in the page group, a volume pairing label, a page offset and a content-based signature for that page, so as to allow the target storage system to identify in one or more particular pages of the page group that are inconsistent between the source and target storage systems.

As noted above, the replication process carried out in illustrative embodiments is assumed to comprise a synchronous replication process in which write requests directed by one or more host devices to the source storage system are mirrored to the target storage system. For example, when a synchronous replication process is enabled for a particular logical storage volume or set of logical storage volumes, the source storage system mirrors host writes to the logical storage volume(s) to the target storage system as part of handling those host writes, and only responds to an initiating host after receiving acknowledgement of successful replication from the target storage system.

The term "write request" as used herein is intended to be broadly construed, so as to encompass one or more IO operations directing that at least one data item of a storage system be written to in a particular manner. A given write request is illustratively received in the storage system 105 from one of the host devices 102. For example, in some embodiments, a write request is received in distributed storage controller 108 of the storage system 105, and directed from one processing module to another processing module of the distributed storage controller 108. More particularly, a received write request may be directed from a routing module of the source storage system to a control module of the source storage system. Other arrangements for receiving and processing write requests from one or more host devices can be used.

As noted above, the replication process can additionally include a cycle-based asynchronous replication process in which the control modules 108C scan differences in designated replication data between replication cycles, and send corresponding data transfer requests as needed to the routing modules 108R. The routing modules 108R in turn replicate the data to a remote storage node cluster of the target storage system, and then respond to the control modules 108C regarding the data replication results.

The routing modules 108R illustratively comprise respective messaging interfaces and respective corresponding instances of replication control logic. These messaging interfaces are utilized by the corresponding instances of replication control logic to generate routing-to-control messages for transmission to one or more of the control modules 108C and to process control-to-routing messages received from one or more of the control modules 108C in conjunction with the replication process.

For example, as indicated above, a given one of the control modules 108C may be configured to generate a request message as a control-to-routing message for transmission to a given one of the routing modules 108R requesting that the given routing module transfer designated replication data to the target storage system.

The synchronous replication process in the present embodiment is therefore assumed to be carried out by the processing modules 108C, 108D, 108R and 108M. It is further assumed that the control modules 108C write data pages in the storage system 105 via the data modules 108D in accordance with write requests received from host devices 102 via the routing modules 108R. At least a subset of the host devices 102 illustratively comprise respective compute nodes of the computer system 101.

Execution of a given write request received in the storage system 105 from a host device illustratively involves the following operations:

1. Receive the write request in a particular control module 108C from a particular routing module 108R.
2. Acquire CIO address range lock for the logical address range to be written, where CIO refers to an IO process component in the control module 108C. As noted above, the control modules have ownership of particular logical address spaces, and the CIO address therefore denotes a global logical address for a given storage block.
3. Perform a read-modify operation if the write is a small or unaligned write. Examples of read-modify operations for use with small or unaligned writes can be found in the above-cited U.S. Pat. No. 9,104,326.
4. Write the data pages to a data module 108D, based on a hash-to-data ("H2D") table. New hash handles are generated for the respective data pages, and reference counts associated with the new hash handles are incremented.
5. Release the CIO address range lock.
6. Send a response back to the requesting routing module 108R.
7. Decrement reference counts associated with the old hash handles of respective data pages that have been overwritten. These are examples of what are more generally referred to herein as "dereferencing operations."

The reference counts mentioned above are illustratively maintained for respective physical blocks in the storage devices 106 and each such reference count indicates for its corresponding physical block the number of logical blocks that point to that same physical block. When all logical block references to a given physical block are removed, the reference count for that physical block becomes zero and its capacity can be released. A given "dereferencing operation" as that term is broadly used herein is intended to encompass decrementing of a reference count associated with a physical block.

In conjunction with release of logical address space in the storage system 105, the storage controller 108 makes the released logical address space available to users, executes dereferencing operations for respective ones of the physical blocks corresponding to the released logical address space, and releases any physical capacity for which the corresponding reference counts reach zero.

The logical address space illustratively comprises one or more ranges of logical block addresses or LBAs each comprising a LUN ID and an offset. For example, each LBA can identify a particular one of the user data pages 112. The LBAs each correspond to one or more physical blocks in the storage devices 106. Other types of LBAs and logical address spaces can be used in other embodiments. The term "logical address" as used herein is therefore intended to be broadly construed.

A given such logical address space may be released responsive to deletion of a corresponding storage volume, snapshot or any other arrangement of data stored in the storage system 105. Other conditions within the storage system 105 can also result in release of logical address space.

As indicated above, the storage controller 108 via its processing modules 108C, 108D, 108R and 108M is configured to implement multi-phase verification of synchronously replicated data in the storage system 105.

In this embodiment, the storage controller 108 is configured to implement a logical storage layer in which logical blocks are associated with respective content-based signatures and a physical storage layer in which the content-based signatures are associated with respective physical blocks in the storage devices 106. As part of this process, the storage controller 108 maintains reference counts for respective ones of the physical blocks, with a given such reference count indicating a number of the logical blocks that map via their respective content-based signatures to the same physical block.

In conjunction with the replication process being carried out by the processing modules 108C, 108D, 108R and 108M, a particular one of the control modules 108C may detect a replication failure condition for a given write request received from one of the host devices 102, which may in some embodiments comprise a compute node of the computer system 101. The particular control module 108C provides a notification of the detected replication failure to the management module 108M.

The synchronous replication process in this embodiment is assumed to be configured such that the target storage system generates for each successfully mirrored write request a corresponding response back to the source storage system. This response generally comes from a routing module of the target storage system back to the particular control module that requested the data transfer for mirroring of the write request. The requesting control module would then normally provide a replication acknowledgement back to the host device that generated the write request, so as to indicate to the host device that the write request has been successfully mirrored to the target storage system.

The term "replication acknowledgement" as used herein is also intended to be broadly construed, so as to encompass any type of update, status report or other message that would ordinarily be provided by a processing module of a storage system to a host device responsive to a write request generated by that host device and directed to a data item that is subject to replication in the storage system.

The detected replication failure condition for the given write request therefore illustratively comprises a failure to receive in the requesting control module a corresponding response from the target storage system indicating that the given write request has been successfully mirrored to the target storage system. For example, the replication failure condition may be detected upon expiration of a specified timeout period without the expected successful mirroring response being received from the target storage system. The timeout period may be measured from transmission of a data transfer request from the requesting control module of the source storage system. Other types of replication failure conditions and failure detection mechanisms can be used in other embodiments.

The notification of the detected replication failure condition may be one of a plurality of such notifications received in the management module 108M from respective different ones of the control modules 108C. Responsive to receipt of a notification of the detected replication failure condition, the management module 108M may cause the replication process to enter a failure recovery mode of operation.

In some embodiments, recovery operations are performed in order to recover from failures that may arise due to source or target crashes, link timeouts, link losses or other causes. For example, such recovery operations can be performed in order to recover synchronization between source and target after a failure that occurs during the synchronous replication process. Other types of recovery operations may be applied in other types of failure situations in other embodiments.

As indicated previously, the host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the storage system 105 to reside in different data centers. Numerous other distributed implementations of the host devices 102 and/or the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 4 and 5.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controllers 108 and storage nodes 115 can be used in other embodiments.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement multi-phase verification of synchronously replicated data in a clustered storage system in other embodiments. In some embodiments, the replication control logic of these processing modules comprises at least a portion of a replication engine of the storage controller 108.

In other embodiments, only subsets of these components, or additional or alternative sets of components, may be used, and such components may exhibit alternative functionality and configurations.

For example, in some embodiments, at least portions of the functionality for multi-phase verification of synchronously replicated data as disclosed herein can be implemented in a host device, in a storage system, or partially in a host device and partially in a storage system.

Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

Additional details of illustrative embodiments will now be described with reference to FIGS. 2 and 3.

Referring now to FIG. 2, information processing system 200 in an illustrative embodiment comprises a source site data center 222S coupled to network 104. The source site data center 222S comprises a storage system 105S having storage devices 106S and an associated storage controller 108S. The source site data center 222S further comprises a set of production servers 224S coupled to the storage system 105S. The storage controller 108S comprises replication control logic 225S, snapshot generator 226S and signature generator 228S.

The storage system 105S is assumed to comprise an instance of storage system 105 previously described in conjunction with FIG. 1, although other types of storage systems can be used in other embodiments.

The source site data center 222S is coupled via one or more communication channels 204 of the network 104 to a target site data center 222T of the system 200. The target site data center 222T comprises a storage system 105T having storage devices 106T and an associated storage controller 108T. The target site data center 222T further comprises a set of recovery servers 224T coupled to the storage system 105T. The storage controller 108T comprises replication control logic 225T, snapshot generator 226T and signature generator 228T.

Like the storage system 105S, the storage system 105T is also assumed to comprise an instance of storage system 105 previously described in conjunction with FIG. 1.

The source site data center 222S and the target site data center 222T are examples of what are more generally referred to herein as respective ones of a "source site" and a "target site" of an information processing system. The source site data center 222S and the target site data center 222T will therefore also be referred to herein as respective source site 222S and target site 222T of the system 200. In some embodiments, the target site 222T comprises a disaster recovery site data center and the source site 222S comprises a production site data center, although other arrangements are possible.

The source site 222S and target site 222T may be implemented in respective distinct local and remote geographic locations, although it is also possible for the two sites to be within a common facility or even implemented on a common processing platform.

It is assumed that data is replicated in system 200 from the source site 222S to the target site 222T using a replication process that begins in an asynchronous replication mode, and subsequently transitions from the asynchronous replication mode to a synchronous replication mode. For example, the asynchronous replication mode may be used to replicate the bulk of a given set of data from the storage system 105S to the storage system 105T. The mirroring functionality of the synchronous replication mode is then enabled. Other arrangements utilizing different replication modes and different transitions between the modes are possible. It is also possible that the system 200 can be configured to support only synchronous replication with no asynchronous replication.

The synchronous replication mode in some embodiments is illustratively configured to mirror data writes between the source and target storage systems 105S and 105T. For example, when a host device implementing one or more of the production servers 224S writes data to the source storage system 105S, the storage system 105S responds to the host device with an acknowledgement of successful storage in the storage system 105S only after the storage system 105S sends the data to the target storage system 105T and receives an acknowledgement of successful storage back from the storage system 105T.

An asynchronous replication mode in some embodiments performs cycle-based asynchronous replication to periodically transfer data in multiple cycles from the source site 222S to the target site 222T. The data replicated from the source site 222S to the target site 222T can include all of the data stored in the storage system 105S, or only certain designated subsets of the data stored in the storage system 105S, such as particular designated sets of LUNs or other logical storage volumes. Different replication processes of different types can be implemented for different parts of the stored data.

Further details regarding asynchronous replication processes suitable for use in illustrative embodiments herein can be found in U.S. patent application Ser. No. 15/662,809, filed Jul. 28, 2017 and entitled "Automatic Verification of Asynchronously Replicated Data," which is incorporated by reference herein. Other embodiments need not utilize these automatic verification techniques, and can be implemented using alternative verification techniques as well as other types of replication processes. Accordingly, illustrative embodiments herein are not limited to use with cycle-based asynchronous replication, but are more generally applicable to other types of data replication.

As noted previously, a "replication process" as that term is broadly used herein may include both asynchronous and synchronous replication modes as well as support for concurrent operation of such modes and separate operation of the individual modes. It is also possible in some embodiments that a replication process may comprise only synchronous replication, instead of multiple distinct replication modes.

Each of the source site 222S and target site 222T in the FIG. 2 embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, the storage controllers 108S and 108T or various components thereof can each be implemented in the form of one or more LXCs running on one or more VMs. Other arrangements of one or more processing devices of a processing platform can be used to implement the storage controllers 108S and 108T and/or their respective components. Other portions of the system 200 can similarly be implemented using one or more processing devices of at least one processing platform.

The source site 222S and target site 222T are illustratively implemented on respective distinct processing platforms, although numerous other arrangements are possible. For example, in some embodiments at least portions of the source site 222S and the target site 222T may be implemented on the same processing platform.

An example messaging flow associated with a particular host write that is to be replicated from the source storage system 105S ("source") to the target storage system 105T ("target") as part of a synchronous replication process or synchronous replication mode of the system 200 illustratively comprises the following steps:

1. Host write
2. Extent lock at source
3. Write at source
4. Transmit to target
5. Receive in target
6. Extent lock at target
7. Write at target
8. Release extent lock at target
9. Return status to source
10. Update A2H table locally at source
11. Release extent lock at source
12. Return status to host The extent lock refers to locking of a particular address range in conjunction with the host write. As mentioned previously herein, the A2H table updated in step 10 provides a mapping between logical addresses and corresponding content-based signatures of respective data pages. As the host write illustratively changes content of one or more such data pages, the content-based signatures and associated A2H table are updated in conjunction with the host write.

An example of a replication failure condition in this embodiment is a failure of a transmitting control module to receive an expected response from the target storage system 105T as part of the status report in step 9 above indicating that the given host write has been successfully mirrored to the target storage system 105T. Upon detection of such a replication failure condition, the transmitting control module provides a notification to a management module of the source storage system 105S.

One or more messages associated with returning status back to the host in step 12 of the synchronous replication messaging flow may therefore be viewed as an example of what is more generally referred to herein as a "replication acknowledgement."

The replication process carried out between the source storage system 105S and the target storage system 105T in the FIG. 2 embodiment illustratively utilizes multi-phase verification techniques of the type previously described herein in conjunction with the storage system 105 of FIG. 1.

The operation of the information processing system 200 will now be described in further detail with reference to the flow diagram of the illustrative embodiment of FIG. 3. The process as shown includes steps 300 through 318, and is suitable for use in the system 200 but is more generally applicable to other types of information processing systems in which multiple storage systems are configured to participate in a replication process.

Figure 3:
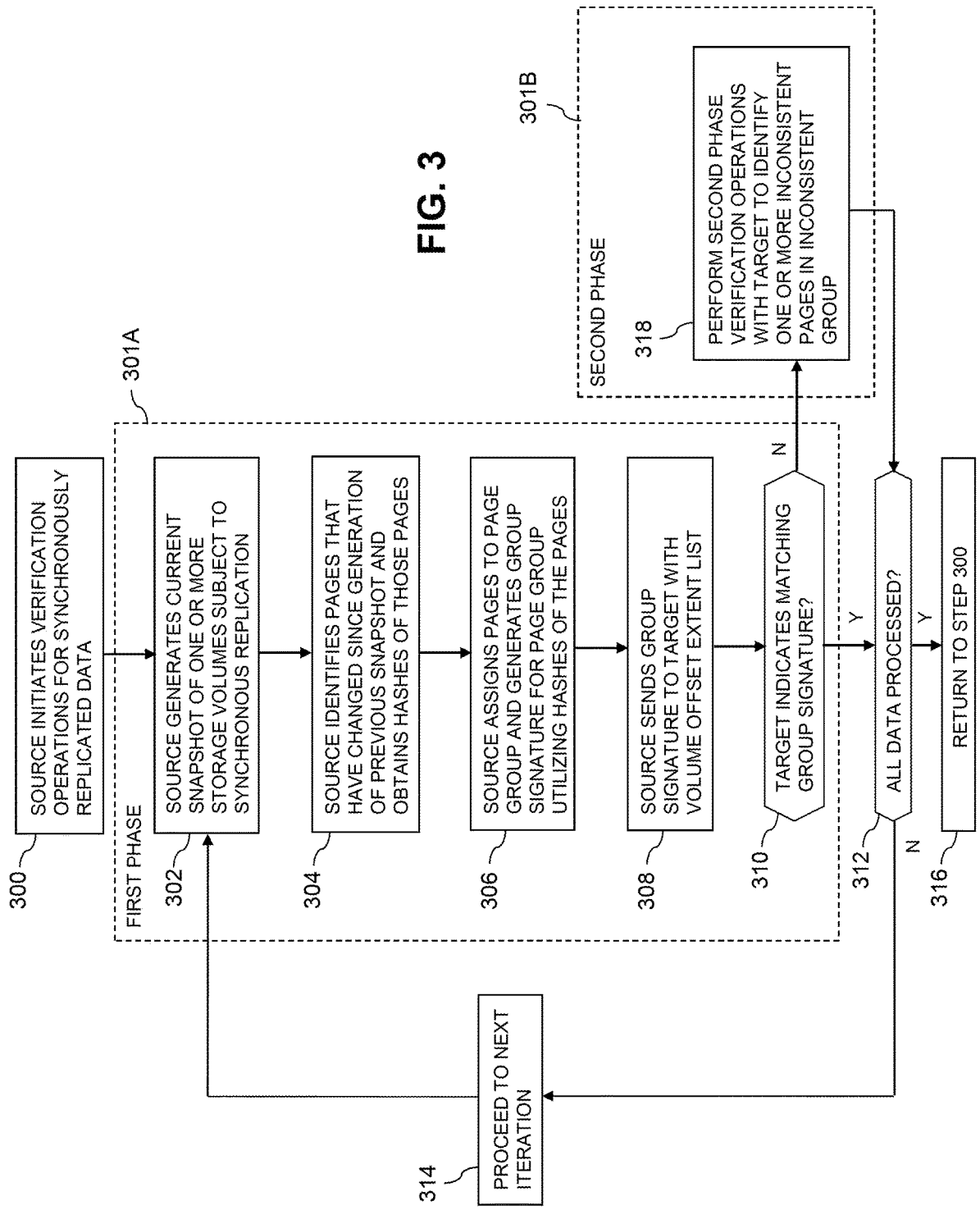
FIG. 3 is a flow diagram showing an example of multi-phase verification of synchronously replicated data in an illustrative embodiment.

The steps of the FIG. 3 process are illustratively performed by cooperative interaction of replication engines or other arrangements of replication control logic of respective storage controllers in respective source site and target storage systems, also referred to as simply respective "source" and "target" in the figure. A given such storage controller in a source site or target storage system can comprise a distributed storage controller such as storage controller 108 implemented in the manner illustrated in FIGS. 1 and 2.

It is assumed for the FIG. 3 embodiment that the source has initiated a synchronous replication process to mirror host writes received from one or more host devices to the target. The synchronous replication process may be a synchronous replication mode of a replication process that includes both asynchronous and synchronous replication modes. Other embodiments need not support asynchronous replication.

In step 300, the source initiates verification operations for synchronously replicated data. The synchronously replicated data illustratively comprises at least a portion of one or more storage volumes that have been replicated from the source to the target in conjunction with the synchronous replication process. The data verification operations may be performed periodically or under other conditions. For example, data verification may be performed at regularly recurring points in time during a synchronous replication process and/or after particular amounts of data have been replicated.

The verification operations in this example comprise operations of a first phase 301A and a second phase 301B. As will become apparent, the first phase 301A is performed in each of a plurality of iterations in order to determine if there is an inconsistency between source and target for a corresponding page group, and the second phase 301B is performed only for those page groups in which an inconsistency is identified in order to identify a particular inconsistent page or pages within an inconsistent page group.

In step 302, the source generates a current snapshot for one or more storage volumes subject to synchronous replication to the target. Such a snapshot is illustratively generated using the snapshot generator 226S of the storage controller 108S. The source illustratively waits for a designated waiting period after generation of the current snapshot in step 302 in order to ensure that all data of the one or more storage volumes captured by current snapshot has been replicated to the target. A given "snapshot" as the term is broadly used herein is intended to encompass a point-in-time replica and in some cases can comprise a set of multiple snapshots of respective storage volumes or other types and arrangements of data, also referred to as a snapshot set or a "snap set."

In step 304, the source identifies a plurality of pages of the current snapshot that have changed since generation of a previous snapshot for the one or more storage volumes, and obtains respective hashes of those pages. The hashes are examples of what are more generally referred to herein as content-based signatures of respective ones of the changed pages. The hashes are illustratively obtained from A2H tables maintained by one or more of the control modules 108C of the storage controller 108S.

In some implementations of the FIG. 3 process, identifying a plurality of pages of the current snapshot that have changed since generation of a previous snapshot for the one or more storage volumes in step 304 more particularly comprises excluding any pages that are in the process of being changed at the time of performance of the data verification operations. One or more of the excluded pages in a current iteration of the data verification operations are assigned to a different page group in a subsequent iteration of the data verification operations, such that all of the pages are eventually subject to data verification operations.

As a more particular example, identifying a plurality of pages of the current snapshot that have changed since generation of a previous snapshot for the one or more storage volumes in step 304 comprises aggregating dirty trees or other types of dirty page data structures of the current and previous snapshots to identify a first set of one or more pages that have changed since a previous iteration of the data verification operations, excluding from the first set of pages one or more pages identified in one or more dirty page data structures of the one or more storage volumes subject to synchronous replication to obtain a second set of pages, and identifying the second set of pages as the changed pages.

In step 306, the source assigns the changed pages to a page group and generates a group signature for the page group utilizing the hashes of the pages of the page group. The group signature in some embodiments is generated as a function of at least one volume pairing label, at least one page offset and the hashes. Other types of additional or alternative information can be utilized along with the hashes of the respective pages of the page group in generating the group signature.

In step 308, the source sends the group signature to the target, illustratively with a corresponding volume offset extent list. The group signature is configured to allow the target to determine if the page group contains at least one page that is inconsistent between the source and target.

As a more particular example, sending the group signature to the target in step 308 illustratively comprises generating a volume offset extent list for contiguous page offsets with the volume offset extent list comprising one or more volume offset extents each comprising a volume pairing label, a volume start offset and a length, and sending the group signature and the volume offset extent list to the target.

The group signature and volume offset extent list are utilized by the target to reconstruct the page group, to generate a group signature for the reconstructed page group, and to determine if there is any inconsistency between the group signature received from the source and the group signature generated in the target for the reconstructed page group.

In step 310, a determination is made as to whether or not the target has indicated a matching group signature. If the target has indicated a matching group signature, there is no inconsistency between source and target for all of the pages of the group, and so the process moves to step 312. Otherwise, the process moves to step 318 to perform the second phase 301B of the verification operations.

In step 312, a determination is made as to whether or not all of the synchronously replicated data has been processed for data verification. If all data has not been processed, the process moves to step 314 to start another iteration with a different pair of snapshots and a new page group. Otherwise, the process moves to step 316, after which it returns to step 300 to await the next initiation of data verification operations of synchronously replicated data upon which the FIG. 3 process is repeated.

In step 314, the process moves to the next iteration by returning to step 302 of the first phase 301A of the verification operations. The source repeats the first phase 301A of its data verification operations utilizing a different pair of snapshots in each of a plurality of iterations with the current snapshot for one of the iterations becoming the previous snapshot for a subsequent one of the iterations. These iterations illustratively continue until it is determined in step 312 that all replicated data of the one or more storage volumes that is to be subject to data verification has been subject to data verification.

The source in the FIG. 3 process thus initiates a subsequent iteration of the data verification operations responsive to receipt of an indication from the target in step 310 that there is no inconsistency between the group signature received from the source and a corresponding group signature generated in the target.

In step 316, the process moves to step 300 as previously indicated.

In step 318, the second phase 301B of the verification operations is performed to identify one or more particular inconsistent pages of the page group in a current iteration of the data verification operations. The source in the second phase 301B illustratively sends to the target, for each of the pages in the page group, information such as a volume pairing label, a page offset and a hash for that page, so as to allow the target to identify in one or more particular pages of the page group that are inconsistent between the source and target. Additional or alternative information can be sent from the source to the target in the second phase 301B along with the hashes of the respective pages of the inconsistent page group.

In the FIG. 3 process, step 318 of the second phase 301B of the verification operations is performed in a given iteration responsive to receipt of an indication from the target that there is an inconsistency between the group signature received from the source storage system and a corresponding group signature generated in the target. Accordingly, for some iterations both first phase 301A and second phase 301B are performed, while for other iterations only first phase 301A is performed.

Different numbers and types of phases, and arrangements of processing operations into phases, can be used in other embodiments.

It is also to be appreciated that the FIG. 3 process and other features and functionality for multi-phase verification of synchronously replicated data as described above can be adapted for use with other types of information systems, including by way of example an information processing system in which source and target storage systems are both implemented on the same processing platform.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for implementing multi-phase verification of synchronously replicated data. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different replication processes for respective different sets of replicated data or for different storage systems or portions thereof within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the FIG. 3 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs.

A more detailed example of one possible implementation of the FIG. 3 process will now be described. The multi-phase verification of synchronously replicated data in this particular example is more specifically implemented as follows:

1. Source creates a snap set Sn of a set of production volumes.
2. Source waits for designated 10 timeout period (e.g., 30 seconds) to make sure all data in Sn have safely transferred to target.
3. Target creates a snap set Sn' of corresponding paired production volumes, also referred to as respective recovery volumes.
4. Phase 1: Page Group Inconsistency Check
   a. Source obtains pages on an aggregated dirty tree between current snap set Sn and previous snap set Sn-1, and retrieves hashes of the pages. These are changed pages that have not been verified since creation of the previous snap set Sn-1. If the previous snap set Sn-1 does not exist, all dirty trees of Sn and its ancestors are aggregated to determine the changed pages.
   b. If a page obtained in 4.a is also on a production volume dirty tree, source skips the page. This is a page that has been modified since creation of the current snap set Sn, and is therefore left for the next iteration of the verification process.
   c. After accumulating a predefined number of pages, source forms a page group, and calculates a hash of the page group using the volume pairing label, page offset, and hashes of all the pages in the group.
   d. Source constructs a volume offset extent list for contiguous page offsets, and issues a Phase 1 verification command to the target including the page group hash from 4.c and the extent list of <volume pairing label, volume start offset, length>.
   e. Target constructs a page group against Sn' based on volume offset information from 4.d, reads the hash of each page in the group, then computes a hash of the page group using the same technique applied in 4.c.
   f. Target compares the page group hashes from steps 4.c and 4.e. If the page group hashes are the same, there is no inconsistency between source and target for any page in the page group, so let n=n+1, and return to step 1 to start the next iteration of the verification process; otherwise, there is at least one inconsistent page in the page group, so perform Phase 2 verification in step 5.
5. Phase 2: Individual Page Inconsistency Identification
   a. For each page in the page group, source sends <volume pairing label, page offset, page hash> to target.
   b. Target reads hashes of respective pages of the page group from the snap set Sn' using the specified volume pairing label and page offsets.
   c. Target compares page hashes from 5.a and 5.b for each page of the page group, and if they are different for a given page, reports a potential data inconsistency for that page back to the source.
6. Let n=n+1, and return to step 1 to start the next iteration of the verification process.

The example multi-phase verification process described above is illustratively executed by the source and target utilizing their respective replication control logic, snapshot generator and signature generator instances. It is to be appreciated that the particular process steps are exemplary only, and can be varied in other embodiments. For example, different types of process operations can be used in other embodiments.

Illustrative embodiments of content addressable storage systems or other types of storage systems with functionality for multi-phase verification of synchronously replicated data as disclosed herein can provide a number of significant advantages relative to conventional arrangements.

For example, some embodiments utilize at least a first phase and possibly a second phase in each of a plurality of iterations of data verification operations, with the first phase of a given iteration verifying replicated data of a group of pages utilizing a group signature and the second phase of the given iteration identifying one or more individual problematic pages in the given group of pages only if that particular group of pages was collectively identified as problematic in the first phase. In some embodiments, different pages are included in the page group in different iterations of the data verification operations, until all replicated data has been subject to data verification.

Such arrangements advantageously provide highly efficient data verification that can substantially reduce network bandwidth consumption between the source and target storage systems while also avoiding any data integrity issues that may arise from write requests that are "in flight" during data verification.

An illustrative embodiment of this type recognizes that data inconsistencies are relatively rare events, which tend to occur only due to unforeseen hardware or software failures, and therefore reduces the network bandwidth usage during verification by transferring content-based signatures only when potential data inconsistency in a page group is detected. As each such content-based signature in some embodiments may be on the order of 20 bytes, sending the content-based signature plus volume pairing label and offset information to the target for each page would otherwise consume excessive network bandwidth as well as lengthen the amount of time required to perform data verification.

Moreover, some embodiments are configured to skip for a given iteration any pages that are subject to an update at that time, and to perform one or more additional iterations of the data verification operations until an entire address space of the synchronously replicated data is covered. For each such iteration of the verification operations, such an embodiment compares part of the replicated volume or set of volumes that is expected to be identical, instead of the entire volume or set of volumes.

Illustrative embodiments provide the above-described advantages in clustered storage systems comprising storage controllers that are distributed over multiple storage nodes. Similar advantages are provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing systems 100 and 200 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as source and target storage systems 105S and 105T, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100 or 200. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms utilized to implement host devices and storage systems with multi-phase verification of synchronously replicated data will now be described in greater detail with reference to FIGS. 4 and 5. Although described in the context of system 100, these platforms may also be used to implement at least portions of information processing system 200 or other types of information processing systems configured to perform synchronous replication in other embodiments.

Figure 4:
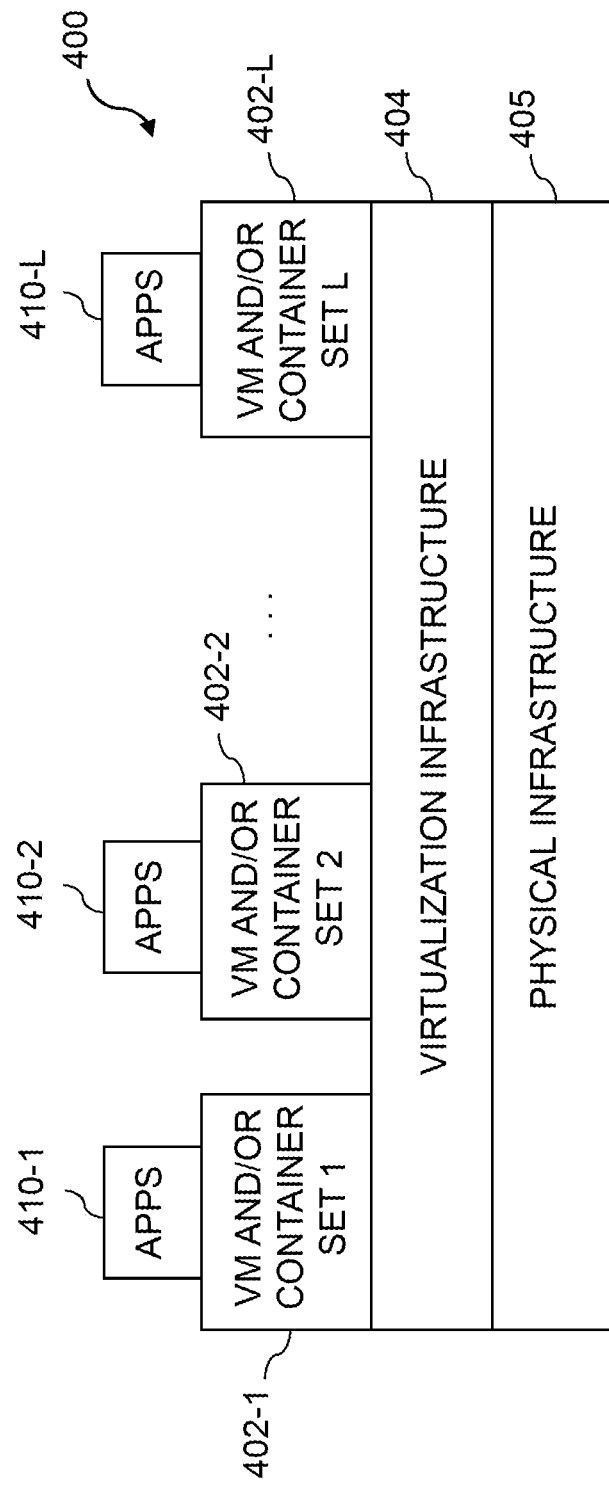
FIGS. 4 and 5 show examples of processing platforms that may be utilized to implement at least a portion of an information processing system in illustrative embodiments.
Figure 5:
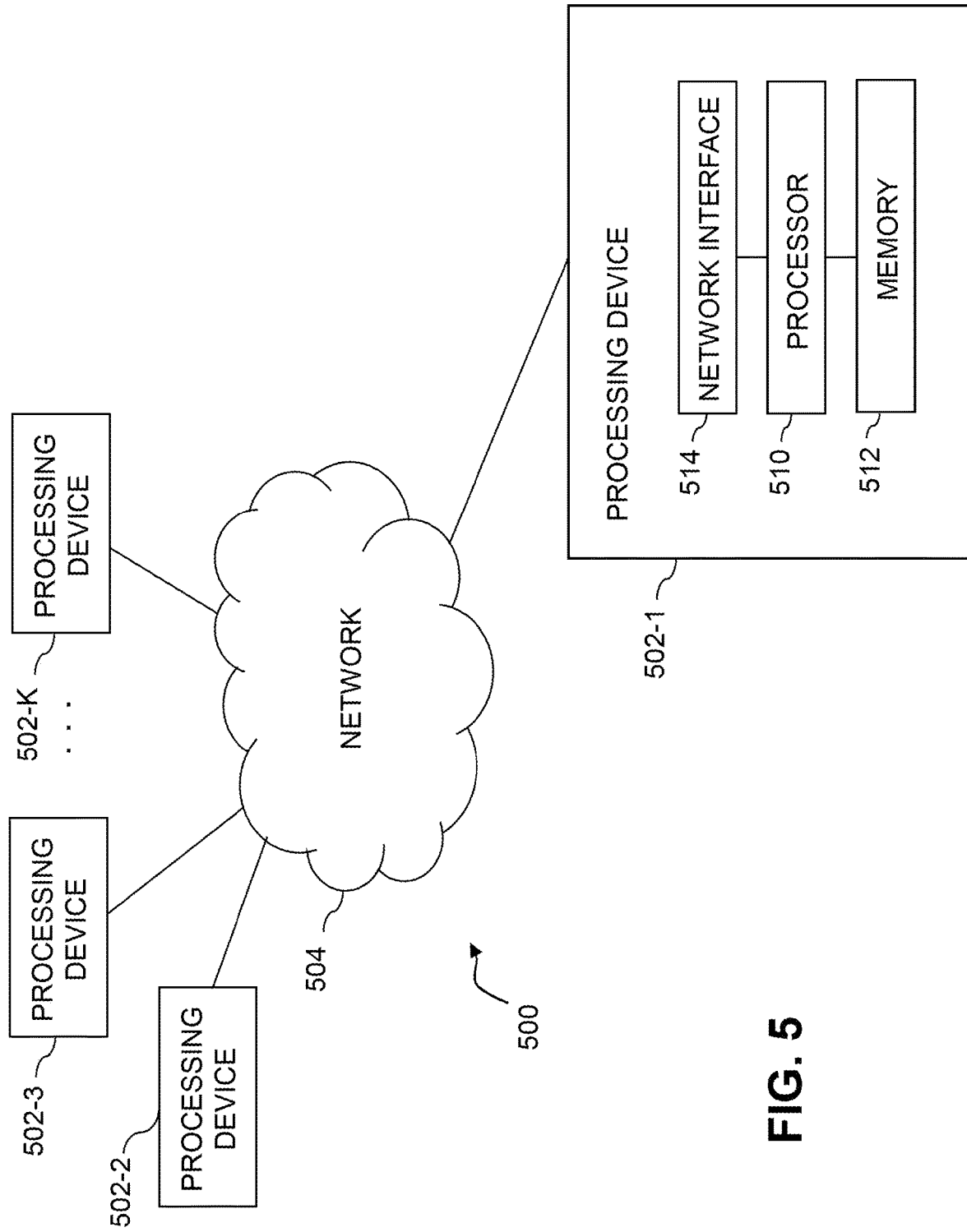

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can illustratively provide at least portions of the functionality described above. For example, one or more of the VMs can be configured to implement at least a portion of a storage controller and its associated replication control logic and other modules for providing multi-phase verification of synchronously replicated data in the system 100.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can also illustratively provide at least portions of the functionality described above. For example, a container host device supporting multiple containers of one or more container sets can be configured to implement at least a portion of a storage controller and its associated replication control logic and other modules for providing multi-phase verification of synchronously replicated data in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, ... 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a graphics processing unit (GPU), or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the multi-phase verification functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, processing modules, replication control logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    a storage system comprising a plurality of storage devices and a storage controller;
    the storage system being configured to participate as a source storage system in a synchronous replication process with a target storage system;
    wherein in conjunction with the synchronous replication process, the source storage system in performing data verification operations is further configured:
    to generate a current snapshot for one or more storage volumes subject to synchronous replication to the target storage system;
    to identify a plurality of pages of the current snapshot that have changed since generation of a previous snapshot for the one or more storage volumes;
    to obtain content-based signatures for respective ones of the changed pages;
    to assign the changed pages to a page group;
    to generate a group signature for the page group based at least in part on the content-based signatures of the pages of the page group; and
    to send the group signature to the target storage system;
    wherein the group signature is configured to allow the target storage system to determine if the page group contains at least one page that is inconsistent between the source and target storage systems;

wherein identifying a plurality of pages of the current snapshot that have changed since generation of a previous snapshot for the one or more storage volumes comprises excluding any pages that are in a process of being changed at a time of performance of the data verification operations; and wherein the source storage system is implemented using at least one processing device comprising a processor coupled to a memory.

2. The apparatus of claim 1 wherein the source storage system is configured to repeat at least a portion of its data verification operations utilizing a different pair of snapshots in each of a plurality of iterations with the current snapshot for one of the iterations becoming the previous snapshot for a subsequent one of the iterations.

3. The apparatus of claim 2 wherein the iterations continue until all replicated data of the one or more storage volumes has been subject to data verification.

4. The apparatus of claim 1 wherein one or more of the excluded pages in a current iteration of the data verification operations are assigned to a different page group in a subsequent iteration of the data verification operations.

5. The apparatus of claim 1 wherein identifying a plurality of pages of the current snapshot that have changed since generation of a previous snapshot for the one or more storage volumes comprises:

aggregating dirty page data structures of the current and previous snapshots to identify a first set of one or more pages that have changed since a previous iteration of the data verification operations;

excluding from the first set of pages one or more pages identified in one or more dirty page data structures of the one or more storage volumes subject to synchronous replication to obtain a second set of pages; and identifying the second set of pages as the changed pages.

6. The apparatus of claim 1 wherein the page group has a size that is determined based at least in part on one or more characteristics of a message buffer of the source storage system.

7. The apparatus of claim 1 wherein the source storage system is configured to wait for a designated waiting period after generation of the current snapshot in order to ensure that all data of the one or more storage volumes captured by current snapshot has been replicated to the target storage system.

8. An apparatus comprising:

a storage system comprising a plurality of storage devices and a storage controller;

the storage system being configured to participate as a source storage system in a synchronous replication process with a target storage system;

wherein in conjunction with the synchronous replication process, the source storage system in performing data verification operations is further configured:

to generate a current snapshot for one or more storage volumes subject to synchronous replication to the target storage system;

to identify a plurality of pages of the current snapshot that have changed since generation of a previous snapshot for the one or more storage volumes;

to obtain content-based signatures for respective ones of the changed pages;

to assign the changed pages to a page group;

to generate a group signature for the page group based at least in part on the content-based signatures of the pages of the page group; and to send the group signature to the target storage system;

wherein the group signature is configured to allow the target storage system to determine if the page group contains at least one page that is inconsistent between the source and target storage systems;

wherein generating a group signature for the page group based at least in part on the content-based signatures of the pages of the page group comprises generating the group signature as a function of at least one label, at least one page offset and the content-based signatures; and wherein the source storage system is implemented using at least one processing device comprising a processor coupled to a memory.

9. The apparatus of claim 1 wherein sending the group signature to the target storage system comprises:

generating a volume offset extent list for contiguous page offsets with the volume offset extent list comprising one or more volume offset extents each comprising a label, a volume start offset and a length; and sending the group signature and the volume offset extent list to the target storage system;

wherein the group signature and volume offset extent list are utilized by the target storage system to reconstruct the page group, to generate a group signature for the reconstructed page group, and to determine if there is any inconsistency between the group signature received from the source storage system and the group signature generated in the target storage system for the reconstructed page group.

10. The apparatus of claim 1 wherein responsive to receipt of an indication from the target storage system that there is no inconsistency between the group signature received from the source storage system and a corresponding group signature generated in the target storage system, the source storage system is configured to initiate a subsequent iteration of the data verification operations.

11. The apparatus of claim 1 wherein responsive to receipt of an indication from the target storage system that there is an inconsistency between the group signature received from the source storage system and a corresponding group signature generated in the target storage system, the source storage system is configured to initiate a further phase of the data verification operations to identify one or more particular inconsistent pages of the page group in a current iteration of the data verification operations.

12. The apparatus of claim 11 wherein the source storage system in the further phase of the data verification operations is configured to send to the target storage system, for each of the pages in the page group, a label, a page offset and a content-based signature for that page, so as to allow the target storage system to identify in one or more particular pages of the page group that are inconsistent between the source and target storage systems.

13. The apparatus of claim 1 wherein the source storage system comprises a plurality of storage nodes each comprising one or more of the storage devices and wherein each of the storage nodes of the target storage system further comprises a set of processing modules configured to communicate over one or more networks with corresponding sets of processing modules on other ones of the storage nodes, the sets of processing modules of the storage nodes of the source storage system collectively comprising at least a portion of the storage controller of the source storage system, each of the sets of processing modules comprising one or more control modules, one or more routing modules and one or more data modules, and wherein at least one of the sets of processing modules comprises a management module.

14. A method comprising:

configuring a storage system to participate as a source storage system in a synchronous replication process with a target storage system; and in conjunction with the synchronous replication process, the source storage system performing data verification operations comprising:

generating a current snapshot for one or more storage volumes subject to synchronous replication to the target storage system;

identifying a plurality of pages of the current snapshot that have changed since generation of a previous snapshot for the one or more storage volumes;

obtaining content-based signatures for respective ones of the changed pages;

assigning the changed pages to a page group;

generating a group signature for the page group based at least in part on the content-based signatures of the pages of the page group; and sending the group signature to the target storage system;

wherein the group signature is configured to allow the target storage system to determine if the page group contains at least one page that is inconsistent between the source and target storage systems;

wherein identifying a plurality of pages of the current snapshot that have changed since generation of a previous snapshot for the one or more storage volumes comprises excluding any pages that are in a process of being changed at a time of performance of the data verification operations; and wherein the method is implemented by at least one processing device comprising a processor coupled to a memory.

15. The method of claim 14 wherein one or more of the excluded pages in a current iteration of the data verification operations are assigned to a different page group in a subsequent iteration of the data verification operations.

16. The method of claim 14 further comprising in response to receipt of an indication from the target storage system that there is an inconsistency between the group signature received from the source storage system and a corresponding group signature generated in the target storage system, the source storage system initiating a further phase of the data verification operations to identify one or more particular inconsistent pages of the page group in a current iteration of the data verification operations.

17. A computer program product comprising a non-transitory processor-readable storage medium having stored therein program code of one or more software programs, wherein the program code when executed by at least one processing device causes said at least one processing device:

to configure a storage system to participate as a source storage system in a synchronous replication process with a target storage system; and in conjunction with the synchronous replication process, to configure the source storage system in performing data verification operations:

to generate a current snapshot for one or more storage volumes subject to synchronous replication to the target storage system;

to identify a plurality of pages of the current snapshot that have changed since generation of a previous snapshot for the one or more storage volumes;

to obtain content-based signatures for respective ones of the changed pages;

to assign the changed pages to a page group;

to generate a group signature for the page group based at least in part on the content-based signatures of the pages of the page group; and to send the group signature to the target storage system;

wherein the group signature is configured to allow the target storage system to determine if the page group contains at least one page that is inconsistent between the source and target storage systems; and wherein identifying a plurality of pages of the current snapshot that have changed since generation of a previous snapshot for the one or more storage volumes comprises excluding any pages that are in a process of being changed at a time of performance of the data verification operations.

18. The computer program product of claim 17 wherein one or more of the excluded pages in a current iteration of the data verification operations are assigned to a different page group in a subsequent iteration of the data verification operations.

19. The computer program product of claim 17 wherein responsive to receipt of an indication from the target storage system that there is an inconsistency between the group signature received from the source storage system and a corresponding group signature generated in the target storage system, the source storage system is configured to initiate a further phase of the data verification operations to identify one or more particular inconsistent pages of the page group in a current iteration of the data verification operations.

20. The computer program product of claim 17 wherein identifying a plurality of pages of the current snapshot that have changed since generation of a previous snapshot for the one or more storage volumes comprises:

aggregating dirty page data structures of the current and previous snapshots to identify a first set of one or more pages that have changed since a previous iteration of the data verification operations;

excluding from the first set of pages one or more pages identified in one or more dirty page data structures of the one or more storage volumes subject to synchronous replication to obtain a second set of pages; and identifying the second set of pages as the changed pages.

* * * * *